(12) United States Patent
Lippuner

(10) Patent No.: US 7,299,556 B2
(45) Date of Patent: Nov. 27, 2007

(54) METHOD FOR CHECKING OR CALIBRATING THE ANGLE-DEPENDENT ALIGNMENT OF A HIGH-PRECISION TEST-PIECE

(75) Inventor: Heinz Lippuner, Rebstein (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 10/565,966

(22) PCT Filed: Jul. 23, 2004

(86) PCT No.: PCT/EP2004/008263

§ 371 (c)(1),
(2), (4) Date: Apr. 11, 2006

(87) PCT Pub. No.: WO2005/012833

PCT Pub. Date: Feb. 10, 2005

(65) Prior Publication Data

US 2006/0191148 A1    Aug. 31, 2006

(30) Foreign Application Priority Data

Jul. 28, 2003    (EP)   ................................. 03017032

(51) Int. Cl.
*G01C 5/00*    (2006.01)
(52) U.S. Cl. .......................................... 33/290; 73/1.79
(58) Field of Classification Search .................. 33/290, 33/227, 228, 286, 501.05, 501.06, 502; 73/1.79, 73/1.75, 1.81; 356/508
See application file for complete search history.

(56) References Cited

U.S. PATENT DOCUMENTS 3,874,087 A * 4/1975 Nunlist ...................... 33/275 R (Continued)

FOREIGN PATENT DOCUMENTS

SU          763 682 A      9/1980

OTHER PUBLICATIONS

Hilmar Ingensand, "TPM—Ein Neues Gerät zur vollautomatischen Prüfung von Teilkreisen in elektronischen Theodoliten", X. Internationaler Kurs für Ingenieurvermessung, Technische Universität München, 12.—17.9.1988. (w/Abstract).

(Continued)

*Primary Examiner*—Christopher W Fulton
(74) *Attorney, Agent, or Firm*—Oliff & Berridge, PLC

(57) ABSTRACT

The invention related to a method for checking or calibrating the angle-dependent alignment of a reference structure on a high-precision test-piece. After arrangement of the test-piece on a retainer piece, a pre-alignment of an optical unit and/or the reference structure of the test-piece is carried out, such that the test-piece beam is at least partly incident on a detector and generates at least one point there. The position of the at least one point on the detector is evaluated by means of a control/regulation unit. After a relatively fine alignment of the optical unit relative to the reference structure, by means of the control/regulation unit, depending on the position of the at least one point on the detector, such that the at least one point has a given set position on the detector, a recording of at least the retainer piece rotation angle and/or the measuring piece rotation angle is carried out, whereby a beam from the reference structure of the test-piece is generated, or modified with relation to a beam parameter, in particular, by reflection, stopping, filtering or shaping and the generated or altered beam forms the test-piece beam.

14 Claims, 8 Drawing Sheets

U.S. PATENT DOCUMENTS

| | | | | |
|---|---|---|---|---|
| 4,816,729 A | * | 3/1989 | Carlson | 73/1.79 |
| 6,182,372 B1 | * | 2/2001 | Lamm | 33/290 |
| 6,467,178 B1 | * | 10/2002 | Svensson et al. | 33/286 |
| 6,925,850 B2 | * | 8/2005 | Comer et al. | 73/1.75 |
| 6,948,254 B2 | * | 9/2005 | Stiblert et al. | 33/502 |

OTHER PUBLICATIONS

Andreas Rützler, "Kalibiereinrichtung für Theodoliten", Institut für allgemeine Elektrotechnik und elektrische Messtechnik, Technische Universität Graz, Oct. 1991.

* cited by examiner

METHOD FOR CHECKING OR CALIBRATING THE ANGLE-DEPENDENT ALIGNMENT OF A HIGH-PRECISION TEST-PIECE

The invention relates to a method for checking or calibrating the angle-dependent alignment of a high-precision test piece.

For checking or calibrating high-precision parts which either serve for highly accurate measurement, checking or specification of angles with a precision down to less than 0.5" or 0.15 mgon or generally require highly accurate angle orientations, very high-precision checking or calibrating devices are required, the accuracy of which must be even higher than that of the high-precision test pieces to be checked or calibrated.

Particularly for checking or calibrating a theodolite, in which a horizontal and a vertical angle are determined by—for example static or dynamic—indexings, different devices and methods are disclosed in the prior art.

In a classical theodolite indexing test method known for a relatively long time, a plurality of stationary collimators distributed about the station are sighted manually with the theodolite telescope from a fixed station. The constancy of the angle differences measured at various points of a circle around the test piece, is used as a measure of the horizontal accuracy of angle measurement. For the vertical accuracy of measurement, the collimator angle differences are compared with the reference values. Reference circle testers to carry out such a reference circle test method are known (e.g. PRUTE and PRUFO devices from F. W. Breithaupt & Sohn). Such methods correspond substantially to the test method according to ISO standard 17123-3 (Optics and optical instruments—Field procedures for testing geodetic and surveying instruments), but fixed targets instead of collimators are sighted there. Disadvantages of these theodolite indexing test methods are, inter alia, that complete automation of the measuring process is possible only to a limited extent, the number of possible different measurements is limited to the number of sightable collimators and the result of the measurement is greatly dependent on the observer.

An alternative to the above mentioned method is the interferometric test method of Maurer (Maurer, W.: Ein interferometrisches Verfahren zur Bestimmung von Strichverbesserungen an eingebauten Theodlitenkreisen [An interferometric method for determining line improvement on built-in theodolite circles]; Thesis Munich, 1983; Deumlich, F. & Staiger, R.: Instrumentenkunde der Vermessungstechnik [Instrument theory of surveying technology]). In this method, the angle through which the theodolite to be tested is rotated is derived from the path difference of a laser beam to interferometer reflectors. The maximum interferometrically measurable angle is +/−8.5 gon, and the resolution is stated as 0.01 mgon. Only checking of horizontal angles is possible with the interferometric method. This method is unsuitable for checking vertical angles since it will be necessary for a prism holder to be rotatably connected to the tilting axis of the theodolite, making it impossible to rule out an influence on the vertical indexing and the tilting axis because of the additional weight of the prism holder.

Test methods for checking of a removed reference circle, for example of a theodolite, are known from the prior art. These methods are chiefly comparison methods in which the indexing to be checked on the reference circle is compared with a correspondingly accurate angular normal, for example interferometrically or by means of a precision reference circle. Different devices of this type, which are used, for example, in the Physikalische Technische Bundesanstalt (Prowe, B.: Untersuchungen an einem neuen Teilkreisprüfgerät [Investigations into a new reference circle tester]; Feinwerktechnik & Messtechnik, Issue 5, 1985, pages 213-217) or at the Zentralinstitut für Physik der Erde (Weise, H. & Quart, W.: Eine vollautomatische Messanlage zur Prüfung von Kreisteilungen [A fully automatic measuring unit for checking circle graduations]; Feingerätetechnik, Issue 4, 1975, pages 155-160), or further devices for checking reference circle graduations, for example from CH 372847 or CH 372471, are disclosed in the prior art. In the case of these methods and devices, however, no indexing test of a mounted theodolite is possible but only checking of a removed reference circle. In addition, reference may be made to ISO standard 17123-3 (Optics and optical instruments—Field procedures for testing geodetic and surveying instruments) or DIN 18723, Part 3 (Feldverfahren zur Genauigkeitsuntersuchung geodätischer Instrumente [Field methods for investigating the accuracy of geodetic instruments]).

A device and a method for fully automatic checking and calibration of a theodolite, of a tacheometer or of a total station, summarised below by the term "theodolite", is disclosed in the prior art. This so-called "theodolite test machine" is described in detail, for example, in the article "TPM—Ein neues Gerät zur vollautomatischen Prüfung von Teilkreisen in elektronischen Theodoliten [TPM—A new device for fully automatic checking of reference circles in electronic theodolites]" by Hilmar Ingensand for the X. International Course for Engineering Surveying at the Technical University of Munich on Sep. 12-17, Sep. 1988 and in the diploma thesis "Kalibriereinrichtung für Theodoliten [Calibration device for theodolites]" by Andreas Rützler, implemented at the Institute for General Electrical Technology and Electrical Measurement Technology of the Technical University of Graz in October 1991. The theodolite test machine has an accuracy of about 0.1 mgon and serves, for example, for checking electronic theodolites with a coded reference circle indexing system which immediately outputs an angle without the initialisation otherwise necessary in incremental methods, but has only a single angle indexing instead of diametrical scanning of the reference circle. The error generated here by the mechanical eccentricity of the reference circle is specific for each theodolite and, after measurement with the theodolite test machine, can be stored in the electronic theodolite and automatically corrected. The theodolite test machine permits a fully automatic test sequence, for checking of horizontal and vertical angle indexings in the position of use in the installed state, checking over a major part of the usable measuring range of the theodolite, the analysis of the systematic errors determined in the test procedure and the automatic determination of a correction function, which is stored in the theodolite. The theodolite test machine is suitable for different theodolite series.

This theodolite test machine disclosed in the prior art is described in more detail below with the aid of figures.

Figure 1:
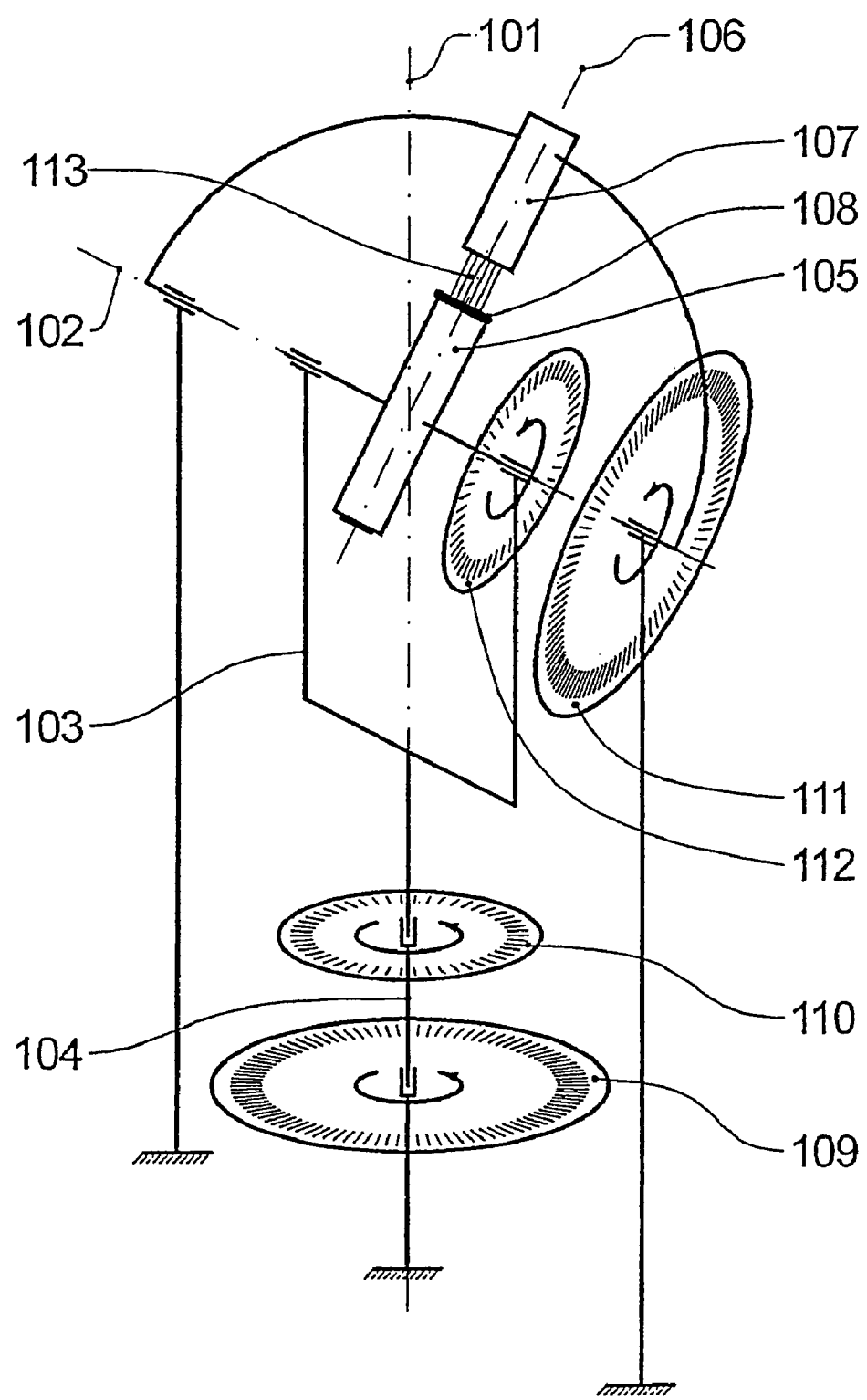
FIG. 1 shows the comparator concept of the theodolite test machine disclosed in the prior art.

The known theodolite test machine, which is based on the comparator concept shown in FIG. 1, follows the idea of a "theodolite in a theodolite". The system of axes of the theodolite test machine thus corresponds geometrically to that of the theodolite to be tested resulting in a substantially common system of axes with a vertical axis 101 and a horizontal axis 102. The theodolite is shown schematically in the form of an alidade 103, which is rotatable about the vertical axis 101 relative to a lower part 104 of the theodolite, and of a telescope 105 tiltable about the horizontal axis 102 and having a sighting axis 106. Since absolute centring of the system of axes of the theodolite to be checked and of the theodolite test machine is ruled out, the angle measuring systems, the normal of the theodolite test machine and the indexing of the theodolite are coupled by means of an autocollimator 107 pivotable about the horizontal axis 102. The coupling is effected by means of a collimated beam 113 via a planar mirror attachment 108 fixed on the telescope 105. Since the theodolite test machine and the theodolite fulfil the condition of orthogonality of the axes (101, 102, 106) all systems of axes are collinear in the autocollimation setting. According to the design of theodolites, the sequence of the horizontal and vertical check is different. In the horizontal check, the alidade 103 of the theodolite to be checked remains substantially fixed and the lower part 104 which is mechanically connected to the angular normal, is rotated about the vertical axis 101. After a coarse setting of the test angle by rotation of the lower part 104 of the theodolite relative to the substantially stationary alidade 103, a fine adjustment of the test angle is made by means of autocollimation by rotating the lower part 104 and the alidade 103 together with high-precision and optionally slightly pivoting the autocollimator 107, with the result that the theodolite and the normal are brought into reference. The horizontal positions are determined by very high-precision horizontal indexing 109 of the theodolite test machine and horizontal indexing 110 of the theodolite and are compared. The vertical checking is effected by pivoting the autocollimator 107 in the common vertical plane about the horizontal axis 102 and hence about the theodolite to be checked. The telescope 105 of the theodolite is also coarsely rotated through the specified angle. After the subsequent autocollimation adjustment, the vertical position of the autocollimator 107 is determined by very high-precision vertical indexing 111 of the theodolite test machine and the vertical position of the telescope 105 is determined by vertical indexing 112 of the theodolite and said positions are compared.

Figure 2:
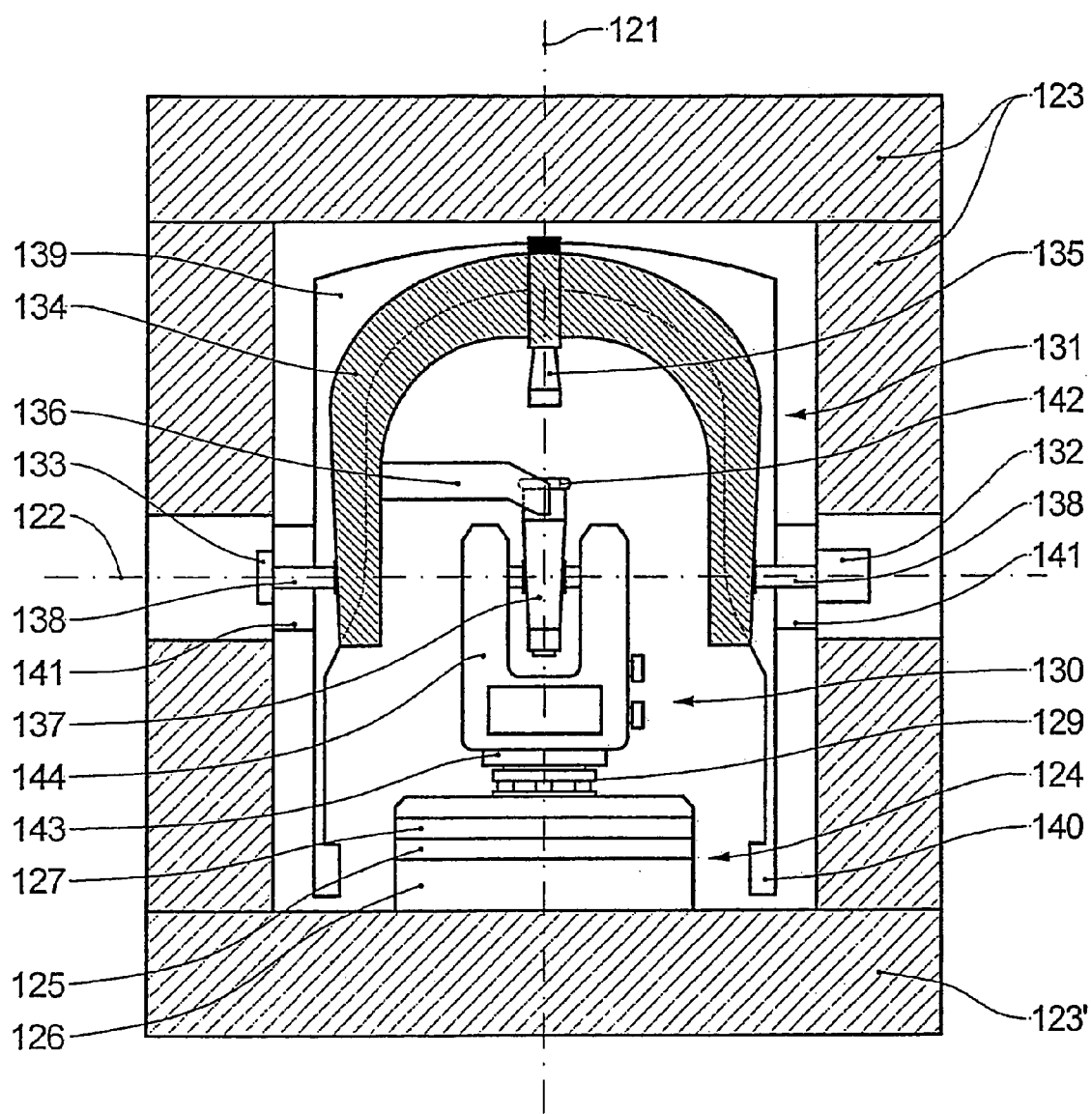
FIG. 2 shows the device setup of the theodolite test machine disclosed in the prior art.

FIG. 2 shows the device design of the known theodolite test machine having a vertical axis 121 and a horizontal axis 122. The design is equal to that of a 3-D coordinate measuring machine with respect to the stability requirements in the μ range, which is why a granite frame 123 is used as a retainer of the systems of axes. The entire machine rests on a concrete foundation (not shown) and is erected in an air conditioned room. A horizontal measuring part 124 which is similar to a precision turntable and is mounted by means of roller bearings 125 and is rotatable about the vertical axis 121 by means of a horizontal drive 126 is fixed on a base plate 123'. The horizontal measuring part 124 also has a horizontal angle sensor 127. A tripod 129 for retaining a theodolite 130 to be checked is mounted on the horizontal measuring part 124. The electrical connection for the attached theodolite 130 is made by means of a slip ring system (not shown). A vertical measuring part 131 has a measuring bridge 134 which is pivotable about the horizontal axis 122 and driveable by means of a vertical drive 132, has a vertical angle sensor 133 and carries an electronic autocollimator 135. A fork-like driver 136 which serves a stop for a telescope 137 of the theodolite 130 is also arranged on the measuring bridge 134. Thus, the vertical position of the telescope 137 substantially follows that of the autocollimator 135. However, since the driver 136 has a play relative to the telescope 137, the driver 136 and the telescope 137 are decoupled during fine adjustment of the measuring bridge 134. In the same way, the driver 136 serves as a stop in the case of horizontal adjustment by means of the horizontal measuring part 124. The stability of the heavy measuring bridge 134 is critical since, particularly in the horizontal position, high bending movements which may falsify the measurement act on the structure of the measuring bridge 134. The U-shaped measuring bridge 134 is mounted on both sides on the granite frame 123, by means of tilting axis bearings 138 in the form of pretensioned ball/sleeve bearings, so as to be rotatable about the horizontal axis 122. In order to relieve these tilting axis bearings 138 from radial forces exerted by the weight of over 12 kg of the measuring bridge 134 and the electronic autocollimator 135 themselves, the machine has an additional weight compensation system. The entire measuring bridge 134 is supported at the centre of gravity by an outer bearing frame 139 which also carries counterweights 140 and takes up the drive forces. This bearing frame 139 rotates in its own separate bearing frame bearings 141. The autocollimation adjustment is effected by the autocollimator 135 of the theodolite test machine projecting a collimated light beam on to a planar mirror attachment 142 which is attached to the telescope 137 of the theodolite 130 normal to the direction of the sighting axis of the telescope 137. The mirror attachment 142 is fixed on the telescope 137 by a collet (not shown). It is thus possible to mount the mirror attachment 142 substantially normal to the optical axis of the telescope 137 and hence to the sighting axis. The mirror attachment 142 reflects the collimated light beam back into the autocollimator 135 of the theodolite testing machine. The light beam strikes a position detector (not shown), which is in the form of a quadrant diode, at the focal point of the autocollimator 135 and produces a light spot there. The resolution of the autocollimator 135 is about 0.01 mgon. The horizontal measuring part 124 with the theodolite 130 and the measuring bridge 134 with the autocollimator 135 are precisely moved by the horizontal drive 126 and the vertical drive 132, respectively, which have 15 V DC motors which can be activated with pulse width modulation, until the light spot is present in the middle of the position detector of the autocollimator 135. In addition, a coarse/fine reduction (not shown) in the ratio 1:9 permits the required very fine positioning of the control loop which comprises the electronic autocollimator 135, a computer (not shown) including control software, and the mechanical drives 126 and 132. The systems of axes of the theodolite 130 and of the theodolite test machine are thus substantially collinear after the autocollimation adjustment. The computer performs the control of the measuring sequence, the regulation of the target adjustment and the evaluation of the results of the measurements.

The sequence of the vertical and horizontal measuring process is described below. The measuring bridge 134 is brought into an approximately horizontal position before the theodolite 130 to be checked is attached, so that the autocollimator 135 is present approximately in the vertical position 100 gon, measured from the zenith, towards which the vertical axis 121 points. The theodolite 130 is fixed on the tripod 129 of the horizontal measuring path 124 with the vertical axis pointing in a perpendicular direction, so that the vertical axis of the theodolite 130 and the vertical axis 121 of the theodolite test machine coincide as far as possible but are at least collinear. The planar mirror attachment 142 is fixed on the objective of the telescope 137 of the theodolite 130 by the collet. The telescope 137 is pivoted into the fork-like driver 136 of the measuring bridge 134. At the beginning of the measurement, the measuring bridge 134 moves to the vertical position 260 gon, measured from the zenith, the beginning of the vertical measuring range. The driver 136 carries the telescope 137 of the theodolite 130 with it during this movement. By the subsequent autocollimation adjustment, the autocollimator 135 is aligned with the mirror attachment 142 fixed on the telescope 137 by a precise adjustment of the measuring bridge 134 and of the horizontal measuring part 124. Owing to the play between driver 136 and telescope 137, the telescope 137 is not put out of adjustment by the driver 136 during the autocollimation adjustment. After this autocollimation adjustment, the angle values of the theodolite 130 and those of the theodolite test machine are polled by the computer and stored. The difference between the vertical angles is the error of the theodolite 130 for the respective vertical position, in this case 260 gon. The measurement of the first measuring point is herewith complete. For the measurement of the next measuring point, the vertical drive 132 of the theodolite test machine moves the measuring bridge 134 and, by means of the driver 136, also the telescope 137 of the theodolite 130 through about 15 gon to the vertical position 275 gon. The measurement of the second point according to the scheme described above now begins. In this way, vertical measurements up to the vertical position 140 gon are carried out, the range from 380 to 20 gon close to the zenith being omitted since, in this range a possible offset of the test piece and of the theodolite test machine axes can scarcely be corrected or cannot be corrected by the horizontal drive 126 of the theodolite test machine. This is because the horizontal movement of the light spot on the position detector of the autocollimator 135 in relation to the vertical angle of rotation is linked to the tangent of the angle between the horizontal position and the actual position of the measuring bridge 134. After the end of the vertical checking, the measuring bridge 134 is moved to the vertical position 100 gon and the investigation of the horizontal indexing of the theodolite 130 is begun. The theodolite 130 is rotated in one direction by means of the horizontal measuring part 124, the lower part 143 and the alidade 144 of the theodolite 130 moving together until the telescope 137 of the theodolite 130 strikes the stop of the fork-like driver 136 and is held, with the result that the alidade 144 stops and only the lower part 143 is moved onwards. Once the desired horizontal angular position of the theodolite 130 has been reached, the horizontal measuring part 124 is rotated slightly in the opposite direction, with the result that the telescope 137 is rotated away from the driver 136 and hence no mechanical stop hinders the adjustment process during the autocollimation adjustment. After the autocollimation adjustment, the measured values are recorded analogously to the vertical measurement. In the horizontal investigation, about 35 points distributed uniformly over the circumference are measured. After the end of the entire horizontal and vertical checking process, the stored pairs of angles are evaluated.

This known theodolite test machine has numerous disadvantages and problems which could not be adequately solved to date. Since the measuring bridge bearing the autocollimator is subjected to high bending moments in the horizontal position by its own weight and the weight of the autocollimator, the measuring bridge must have a stable design so that any deformation of the measuring bridge which falsifies the measurement is as far as possible avoided. However, the weight of the measuring bridge should not be too high since, within the specified tolerances, the load-bearing capacity of the high-precision tilting axis bearing which supports the measuring bridge on the granite frame is greatly limited. For static reasons, in particular in order to avoid deformations and to load the tilting axis bearing as little as possible, a U-shape with tilting axis bearings on both sides appears to be advantageous and in turn requires a twin-column granite frame. Owing to the limited load-bearing capacity of the tilting axis bearings in the form of pretensioned ball/sleeve bearings, the high weight of the measuring bridge also requires a complicated weight compensation system, which further increases the total weight of the theodolite test machine. The solid granite frame required owing to the tilting axis bearing on both sides and surrounding the measuring bridge, the U-shape of the measuring bridge and the weight compensation system severely-limit the accessibility of the theodolite to be checked, which is a hindrance particularly during adjustment work and in the case of large test pieces. The solid structure and the weight of the known theodolite test machine prevent broad potential use since firstly load tolerances of normal industrial floors are exceeded and secondly the theodolite test machine cannot be transported through the normal laboratory doors. Owing to the arrangement of the tilting axis bearings on both sides, stress-free, exact adjustment of the individual tilting axis bearings is very problematic because of static over determination, since the misadjustment of a tilting axis bearing always also acts on the opposite tilting axis bearing, with the result that the high precision requirements can be met only where there is considerable adjustment effort. The stable mounting of the mirror attachment on the telescope is also critical since deviations from the mirror plane relative to the target axis should as far as possible be avoided, and exact alignment of the mirror attachment requires a considerable effort. Different telescope geometries and theodolite model ranges require different mirror attachment collets. Since the reference structure for the entire measuring sequence is formed by the mirror attachment, only the angle sensors and the axes of the theodolite can be checked. Errors in the telescope optical system are thus not taken into account. Only the alignment of the mirror attachment is detectable by means of the autocollimator used, but not the position and quality of individual structures of the telescope optical system, such as, for example, the quality or alignment of individual lenses, of a beam splitter cube, of an image recording area or of the line of the tube. Checking of any laser telemeter integrated in the theodolite cannot take place since the mirror attachment obscures the telescope optical system. Furthermore, the inclinometer in the theodolite cannot be calibrated using the known theodolite test machine. The development of new and even more precise theodolites moreover requires an even higher accuracy of the theodolite test machine.

SU 763682 A discloses a manually operated apparatus for checking a geodetic device which has in particular a sighting apparatus tiltable about an axis of rotation in a vertical plane. A stationary calibration collimator of long focal distance with an ocular micrometer is positioned on a frame, which is present on a table, in such a way that the collimator axis coincides with the axis of rotation of the sighting apparatus—the tilting axis—of the device to be investigated, which is likewise installed on the table. The device to be investigated can be inclined and horizontally aligned by means of a non-rotatable lifting apparatus. A rotating block which is mounted on one side and acts as a measuring frame for the vertical angle check and the axis of rotation of which coincides with the collimator axis—and therefore in particular with the tilting axis of the device to be investigated— and which has a passage for allowing through collimator beams is arranged between the calibration collimator and the device to be investigated. The heavy rotating block equipped with a plurality of counterweights comprises an optical system which deflects the beam in such a way that it is first displaced parallel by a certain offset, which is not less than the external dimension of the largest device to be checked, and which then deflects the beam which has been displaced parallel by 90° in the plane of the parallel offset, the deflection being achieved by means of a pentaprism at the point of intersection of the axis of the displaced beam with the vertical plane of the tiltable sighting apparatus of the device to be investigated. A small opening through which a part of the collimator beam can pass without reflection or deflection is provided on the first reflecting surface of the optical system of the rotating block. The rotating block is equipped with a highly accurate limbus and an angle reading apparatus. If the device to be investigated is a theodolite, it is possible by means of the apparatus, by swivelling the rotating block, to check the vertical angle measuring apparatus of the theodolite and to generate a mathematical error correction function. Owing to the stationary theodolite, horizontal angle correction is possible for not more than four horizontal angles only by penetration of the theodolite telescope, so that it is not possible to realise a continuous horizontal angle correction function. The alignment of the theodolite telescope with the rotating block and vice versa is carried out by the user viewing either the collimator net in the theodolite telescope or the theodolite net in the collimator telescope with the eye and manually adjusting the axes. The calibration of the entire apparatus is carried out with the aid of the autocollimator eyepiece of the collimator by arranging a calibration prism or a polygonal mirror on the table and measuring the constancy of the position of the optical axis of the apparatus at different positions of the rotating block. Since the apparatus has a nonrotatable retainer apparatus for the theodolite, it is not possible to check a plurality of horizontal angles within a measuring process. It is therefore not possible to determine a correction function obtained from a multiplicity of horizontal angle measurements and store said correction function in the electronic theodolite for automatic error correction. Since only the collimator net or the theodolite net serves as a reference for the check, it is not possible to check or to calibrate individual structures, for example, lens surfaces, beam splitter cubes, image recording area or a laser telemeter with respect to the alignment and position. Since, in this apparatus, the calibration collimator is arranged far away from the device to be investigated, in such a way that the collimator axis coincides with the axis of rotation or tilting axis of the device, a complicated beam guidance system susceptible to error and comprising a plurality of mirrors has to be arranged in the rotating block. This both reduces the torsional rigidity and flexural strength of the rotating block and increases the weight of the rotating block and of the entire apparatus since heavy counterweights are required. Consequently, because of the system itself, it is not possible to meet very high accuracy requirements down to below 0.5" or 0.15 mgon with the device disclosed. However, the apparatus is distinguished by the easy accessibility of the device to be checked since access to the device can be gained from three sides. There is no possibility of carrying out a fully automatic calibration process with the apparatus disclosed.

The object of the invention is to provide a universally usable test method by means of which the angle alignment and the quality of individual reference structures of different highly accurate test pieces, preferably geodetic measuring instruments, can be automatically checked and calibrated in a reliable and highly accurate manner, and to overcome the disadvantages of the test methods of the generic type.

This object is achieved by realising the features of the independent claim. The features which further develop the invention in an alternative or advantageous manner are described in the dependent claims.

The invention is based on the concept that substantial improvements compared with the prior art can be achieved by direct measurement on a reference structure of the test piece.

The method according to the invention is described generally below partly with the aid of descriptions of the device. Possible specific exemplary embodiments are described after the figures and the description of the figures.

A possible device for checking or calibrating the angle-dependent alignment of a reference structure of a high-precision test piece has a plinth as a stable reference base for the checking or calibration process.

This plinth is in the form of a stone body or metal body or in the form of a body which is manufactured from at least one other suitable material or composed, for example, of struts which serves as a reference base. The plinth has, for example, a L-shaped basic structure. A retainer part for retaining the test piece is mounted so as to be rotatable relative to the plinth about a retainer part axis—running in the perpendicular direction—by means of a high-precision bearing. The retainer part may be, for example, in the form of a precision turntable having a holder optionally adjustable by means of a tripod and intended for retaining the test piece. An angle of rotation of the retainer part relative to the plinth about the retainer part axis, referred to below as angle of rotation of the retainer part, can be measured with high precision, for example, by means of an angle encoder with dynamic or static indexing. If an exact absolute vertical alignment of the retainer part or of the holder is required for checking or calibration, it is furthermore possible to integrate a tilt sensor in the retainer part. In addition, it is possible to use means for inclining the retainer part or the entire plinth. These means for inclination can be used either for exact vertical alignment, in particular of the retainer part or of the test piece, or for checking a tilt sensor of the test piece. In the case of electronic test pieces which require a voltage supply or transmit measured values, the rotatably mounted retainer part is moreover optionally equipped with means for electrical connection, for example a slip ring or rolling ring system, in order to permit an electrical connection between the plinth and the test piece. Of course, radio transmission systems, for example Bluetooth, infrared systems or similar systems can also be used instead.

The device also comprises a measuring part which is mounted so as to be rotatable relative to the plinth about a measuring part axis intersecting the retainer part axis at right angles. An angle of rotation of the measuring part about the measuring part axis is measurable with high-precision, for example by means of an angle encoder with dynamic or static indexing. The basic shape of the measuring part is formed so that the measuring part grips around the test piece by a substantially mirror-symmetrical or axially symmetrical—for example collet-like—formation with respect to the measuring part axis from at least two sides or fully encloses said test piece by a substantially rotationally symmetrical formation. The measuring part is rotatable at least in a certain angular range independently of the test piece. Such a surrounding or enclosing, at least partly symmetrical formation of the measuring part has several advantages.

Since the centre of gravity of the measuring part is close to or on the measuring part axis, additional weight compensation can be dispensed with. Consequently, the drive of the measuring part is relieved, the bending and torsional load is considerably reduced and hence the accuracy of the measurement is dramatically increased owing to smaller tolerances. A further advantage of such a design of the measuring part is the possibility of arranging a plurality of measuring components within the measuring plane of the measuring part—in particular on opposite sides relative to the test piece. This makes it possible to realise numerous novel measuring methods, by means of which the accuracy of the measurement can be further increased.

At least one optical unit having an optical detector is arranged on the measuring part. The optical unit serves for receiving at least one test piece beam which interacts with the reference structure of the test piece and is substantially in a measuring plane through which the measuring part axis passes perpendicularly and in which the retainer part axis lies. As a result, the test piece beam produces at least one point on the detector. The test piece beam can either strike the detector directly, possibly shaped by a lens system, or can be deflected or conducted by an optical deflection element, for example a reflecting unit or an optical fibre, in the direction of the optical unit and of the detector and can strike the detector indirectly. With the use of such an optical deflection element, it is possible to arrange the optical unit outside the measuring plane, possibly on a sub element of the measuring part. The test piece beam interacting with the reference structure of the test piece is to be understood generally as meaning a beam, for example a beam of light rays, which interacts directly or indirectly with at least one reference structure of the test piece and/or arrives from such a part. The interaction between the test piece beam and the reference structure takes place, for example, by reflection, scattering, refraction, beam shaping, stopping, filtration or beam generation.

The term "test piece" means an element as a whole which is to be checked or adjusted, for example a geodetic measuring instrument, a polygonal mirror unit or a mechanical high-precision part, without possible auxiliary components mounted for carrying out the measuring process, such as, for example, a mirror attachment. The reference structure means a test piece structure which is to be checked specifically with regard to the angular alignment or its quality. This may be, for example, a body, a surface, an edge or a point. In the case of a test piece having a mirror surface which is to be exactly aligned or which is exactly aligned relative to a base surface, the reference structure is formed, for example, by this mirror surface. In the case of a test piece in the form of a theodolite, the reference structure of the test piece represents, for example, a part of the horizontally and vertically rotatable or tiltable telescope.

Both the retainer part and the measuring part are preferably capable of being driven by an electric motor. Thus, based on the test piece, the receiving area of the optical unit forms a section of a spherical surface which at least partly encloses the test piece, by adjustment of retainer part and measuring part about the retainer part axis or the measuring part axis. If the retainer part axis points in the perpendicular direction and hence the measuring part axis lies in the horizontal plane, a horizontal angle can be adjusted by means of the retainer part and a vertical angle by means of the measuring part.

The rotatable mounting of the measuring part relative to the plinth is effected by means of a measuring part bearing unit which is preferably in the form of an air bearing, which is arranged on a single side of the measuring plane or in the measuring plane. Since only one bearing unit is used, this bearing unit can be adjusted with high precision without resulting in warping with a second bearing unit mounted on the other side of the measuring plane or outside the measuring plane, owing to static overdetermination. This makes it possible to achieve extremely high accuracies of measurement. Because the bearing unit is arranged on one side and lies on a single side of the measuring plane or is arranged centrally and lies in the measuring plane, it is possible to realise a more compact, in particular narrower design of the entire measuring device and to provide substantially better accessibility to the test piece, the accuracy of the measurement of the entire device even being further increased owing to the properties of an air bearing. Different developments of radial and axial air bearings and cylindrical, U-shaped, angled or planar air bearings have in the meantime been disclosed in the prior art. The air bearing must be such that highly precise mounting of the measuring part about the measuring part axis, taking into the account the required tolerances of the device under the forces acting on the bearing, is ensured and both the rigidity and the damping meet the requirements. The design criteria of air bearings have also been disclosed in the prior art. The bearing unit in the form of an air bearing is to be understood as meaning both an individual bearing and an arrangement of a plurality of—in particular clamped—bearings in the form of a bearing unit. Of course, it is possible to use a conventional sliding bearing or roller bearing or possibly a magnetic bearing instead of an air bearing. In some of these cases, however, it is not possible to achieve such small tolerances as in the case of an air bearing.

In addition, it is possible also to form the high-precision bearing of the retainer part as an air bearing.

The measuring part is optionally formed so that apart from the optical unit, an additional optical unit is arranged on that side of the measuring part which is opposite the optical unit with respect to the measuring part axis. This additional optical unit may be, for example, in the form of an additional emitter, an additional mirror, an additional autocollimator or an additional camera. Possible embodiments of the measuring part are to be found in the description of the figures.

A control/regulation unit controls the device, in particular the motor-operated alignment of the optical unit relative to the reference structure of the test piece by means of motor-operated adjustment of the retainer part and of the measuring part as a function of the position of the at least one point produced by the test piece beam on the detector, in particular also or alternatively as a function of a signal of an additional optical unit. Acquired measured data, in particular those of the angle encoder, may be stored and/or evaluated. The control/regulation unit may be, for example, in the form of a personal computer having appropriate ports, a combination of controls or intelligent sensors and actuators, a PLC or a computer system connected to a data network.

Particularly in the case of test pieces whose reference structure to be checked or calibrated with respect to its angular alignment is adjustable relative to the remaining test piece, as is the case, for example, with a theodolite whose angle encoders are to be checked, a handling robot, which is arranged, for example, on the plinth, is used for adjusting the reference structure, for example of the theodolite telescope. It is thus possible to adjust the reference structure and the optical unit of the measuring part simultaneously and to determine angle deviations—in particular of an angle encoder of the test piece—within a short test time.

For checking the thermal behaviour of a test piece, it is possible to use a thermal emitter which is arranged in such a way that the test piece can be heated at least from one side, with the result that, for example, the influence of sunlight and the associated thermal distortion can be simulated.

In the method according to the invention, radiation is generated by the reference structure of the test piece or is modified with respect to a radiation parameter—in particular by reflection, filtration or shaping. This generated or modified radiation forms the test piece beam described above.

For carrying out the method according to the invention, it is possible either to use substantially the device described above or in general the following device is used: the device comprises an adjustable or fixed retainer part for retaining the test piece and an adjustable measuring part, the measuring part and the retainer part being rotatable relative to one another about a retainer part axis and a measuring part axis intersection the retainer part axis at right angles. An angle of rotation of the retainer part about the retainer part axis and an angle of rotation of the measuring part about the measuring part axis are measurable between the measuring part and the retainer part. The device furthermore has an optical unit arranged on the measuring part and having an optical detector for receiving at least one test piece beam which interacts with the test piece and lies substantially in a measuring plane through which the measuring part axis passes perpendicularly and in which the retainer part axis lies, and produces at least one point on the detector. It is of course possible for the optical unit with the detector to be arranged not directly on the measuring part but on another part, means for deflecting the test piece beam to the detector being provided on the measuring part. In addition, the device comprises a control/regulation unit at least for the motor-powered alignment of the optical unit relative to the reference structure of the test piece by means of motor-powered adjustment of the angle of rotation of the retainer part and of the angle of rotation of the measuring part as a function of the position of the at least one point on the detector. For a more exact description of the individual elements of this device, reference may be made to the description of the known theodolite test machine and of the device described above. Of course, the method described can also be used with a device which has a different design but is substantially equivalent.

In the method according to the invention, the test piece is first arranged on the retainer part. This is followed by preliminary alignment of the optical unit and/or of the reference structure of the test piece so that the test piece beam at least partly strikes the detector and produces at least one point there. After the evaluation of the position of this at least one point on the detector, in particular by the control/regulation unit, fine alignment of the optical unit relative to the reference structure is carried out by means of the control/regulation unit as a function of the position of the at least one point on the detector, so that the at least one point reaches a certain reference position. Then follows a determination of at least the angle of rotation of the retainer part and/or of the angle of rotation of the measuring part. Said test piece beam is formed by radiation which is generated by the reference structure of the test piece or as modified by said reference structure with respect to a radiation parameter, for example by reflection, scattering, refraction, stopping, filtration or shaping. The generation of the radiation is effected by means of an emitter which is in the form of, for example, a thermal or luminescence emitter or in the form of a chemical or radioactive emitter. Since the test piece beam which strikes the detector therefore arrives directly or indirectly from the reference structure of the test piece and does not originate from an auxiliary component, such as, for example, an auxiliary mirror, the reference structure can be aligned very precisely relative to the optical unit, or vice versa, since errors due to poor alignment of the auxiliary component relative to the reference structure are avoided. In addition, it is possible to choose reference structures—for example in the form of an illuminated or self-illuminating mark—which can be mechanically coupled only with difficulty, in particular components which are arranged in an optically detectable manner within a lens system. These are, for example, lenses, reticules, beam splitter cubes or an image recording surface within a lens system.

This method is suitable, inter alia for checking or calibrating a test piece equipped with an optical sighting unit, in particular a telescope, preferably a theodolite, a level or geodetic scanner, the optical sighting unit being adjustable about a vertical axis and optionally a tilting axis. An angle of rotation about a vertical axis and optionally an angle of rotation about a tilting axis can be determined herewith. The optical sighting unit determines a sighting axis and has an optically detectable mark, for example a reticule or a light exit. A lower part of the test piece is arranged on the retainer part so that the retainer part axis is substantially collinear with the vertical axis and optionally the measuring part axis is substantially collinear with the tilting axis. Before, during or after the above mentioned preliminary alignment of the optical unit, a preliminary alignment of the sighting unit of the test piece is carried out. By determining the angle of rotation about the vertical axis and/or optionally the angle of rotation of the test piece about the tilting axis, checking or calibration of a test piece can be effected by comparison with, respectively, the angle of rotation of the retainer part and the angle of rotation of the measuring part of the device.

In a possible general embodiment, the radiation is generated by an emitter arranged in the optical unit. Here, the optical unit has, in addition to the emitter, a detector and a lens system for shaping the radiation emitted by the emitter and for focusing the test piece beam on to the detector. The lens system preferably has a variable focal distance. The shaped radiation strikes a reflection surface to be tested with respect to the alignment and formed by the reference structure of the test piece, and is reflected by said surface. The radiation reflected by the reference structure forms the test piece beam which is shaped by the lens system on appropriate alignment of the reference structure relative to the optical unit, thus at least partly strikes the detector and, on exact alignment, produces at least one point at a certain reference position on the detector. The reflecting reference structure is—if required—possibly coated with a reflection-enhancing coating or film. The emitter used is, for example, an LED, the radiation of which is fed via an optical fibre into the focal plane of the lens system. Depending on the application, a quadrant diode, a CCD image sensor or another detector disclosed in the prior art can be used as a detector. If the reference structure serving as a reflection surface is a flat surface, the radiation emitted by the emitter is preferably collimated by the lens system of the optical unit so that the test piece beam is likewise collimated. In the case of a convex or concave reference structure which is formed, for example, by a lens surface of the test piece, the radiation is on the other hand shaped, in particular focused or scattered, by the lens system of the optical unit in accordance with the curvature, in particular the radius. If a lens having an antireflection coating is to be used as the reference structure, the use of additional optical filters in the beam path of the radiation is advantageous. If the reference structure is a lens within a lens system, for example a certain lens within a sighting unit, the use of optical filters may likewise be expedient.

It is also possible for the reference structure to be formed by an optically detectable mark on the test piece or within the test piece, such as, for example, a reticule in the optical system of the sighting unit of the test piece, the radiation being modified with respect to a radiation parameter. This is effected in particular by illuminating a reticule from the side of the objective or of the eye piece of the optical sighting unit of the test piece by an emitter, optionally with the use of optical filters, at least during the fine alignment of the device, this illumination forming the radiation. Here, the reticule is focused by means of the objective of the sighting unit onto the detector of the optical unit, with the result that the at least one point is produced on the detector. Here, the emitter may either likewise be present in the optical unit or may be separately housed, for example in an additional optical unit which is present on that side of the measuring part which is opposite the optical unit relative to the measuring part axis.

It is furthermore possible to dispense with an emitter outside the optical sighting unit of the test piece. This may be the case in particular when the reticule is self-illuminating so that the reticule itself produces the radiation, or if the reticule is illuminated by an emitter arranged in the optical sighting unit. The focusing of the reticule on to the detector is preferably effected by means of the objective or by means of the eye piece. Self-illuminating reticules, for example in the form of a luminescence emitter, are disclosed in the prior art.

If the test piece is a video theodolite, it is possible for the reference structure to be formed by the image recording surface of the theodolite, in particular of the CCD chip, with the result that the orientation and a possible incorrect alignment of the image recording surface are measurable. Furthermore, the camera constant can be checked.

The beam splitter cube in a theodolite telescope can also serve as a reference structure, with the result that the correct angular alignment of a beam splitter cube can also be checked by means of the method.

If a laser telemeter is arranged in the test piece, the test piece beam can be formed by a laser measuring beam emitted by the test piece. The reference structure is thus formed by the laser diode. In this case, it is possible to compare an alignment of the optical axis of the test piece with the alignment of the axis of the laser measuring beam and to detect possible deviation.

In addition, errors within the optical system of the sighting unit can be determined by focusing a structure of at least one part of the sighting unit on to the detector by means of an emitter arranged on the side of the eye piece or the objective of the sighting unit of the test piece. In the case of a focusable optical system, it is also possible to investigate the path of the focusing lens by means of the method described.

The use of an additional optical unit which is arranged on the side of the eye piece results in further possibilities. Like the optical unit, the additional optical unit may be in the form of an autocollimator or a camera for detecting the alignment relative to a reference structure which is formed by the eye piece itself or by a structure detectable from the side of the eye piece. Alternatively, the additional optical unit may be in the form of an additional emitter which emits a beam which has certain optical properties—in particular three-dimensional structuring in the form of a certain pattern. After an interaction with at least one reference structure of the test piece, this beam is detected by the opposite optical unit in the form of the test piece beam. By comparing the optical properties—in particular the structurings—of the beam emitted by the additional optical unit and of the test piece beam received by the optical unit, any optical errors in the optical system of the test piece, for example inadequate optical telescope quality, any lens errors, aberrations or distortions and focusing errors, are detected.

Figure 3:
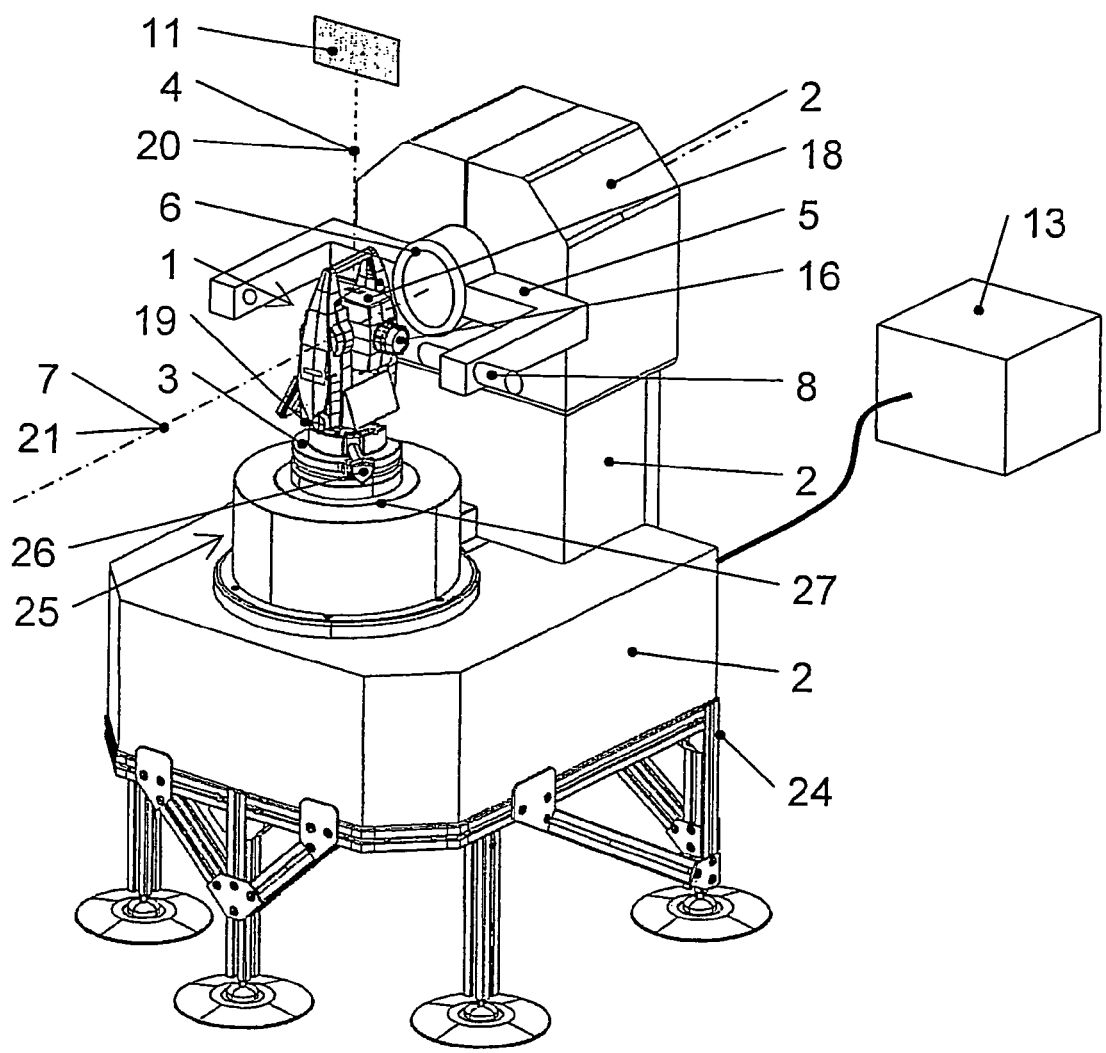
Figure 4:
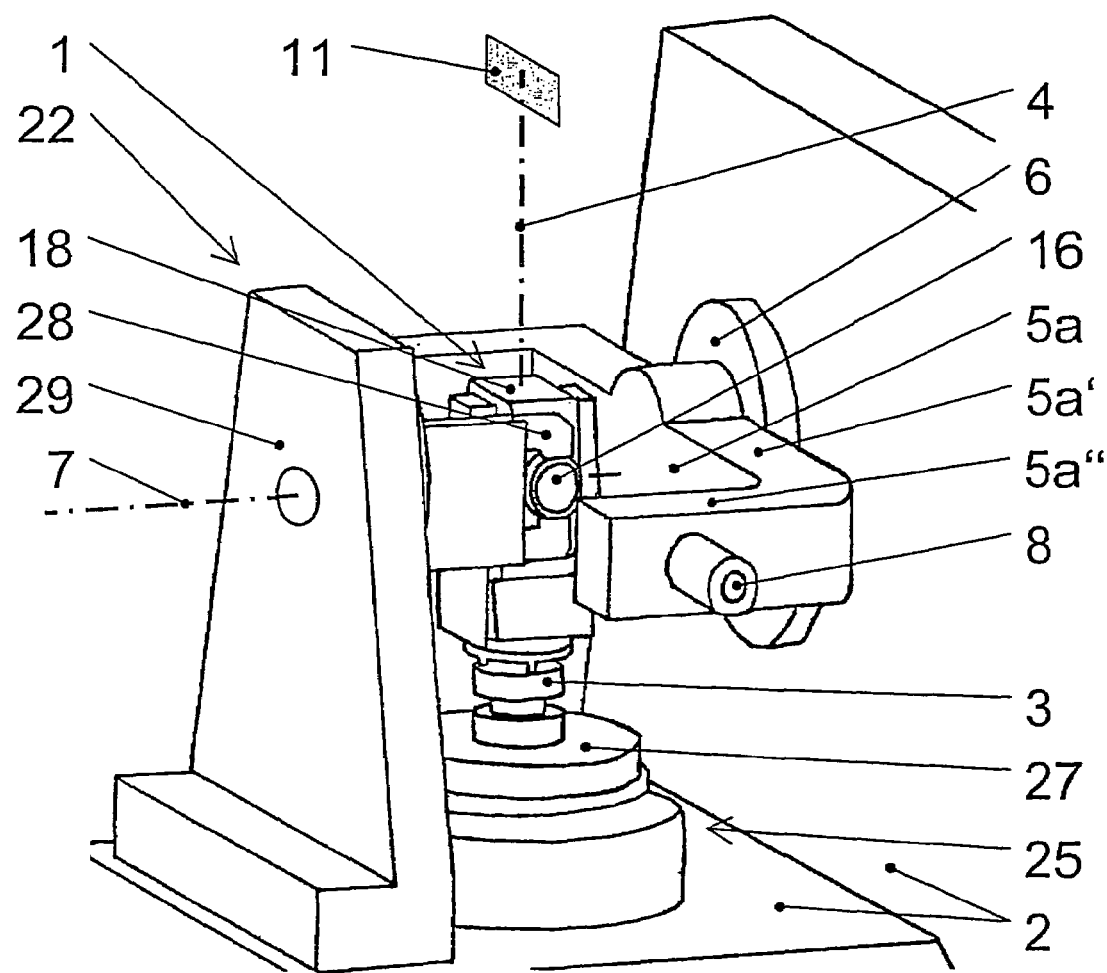
Figure 5:
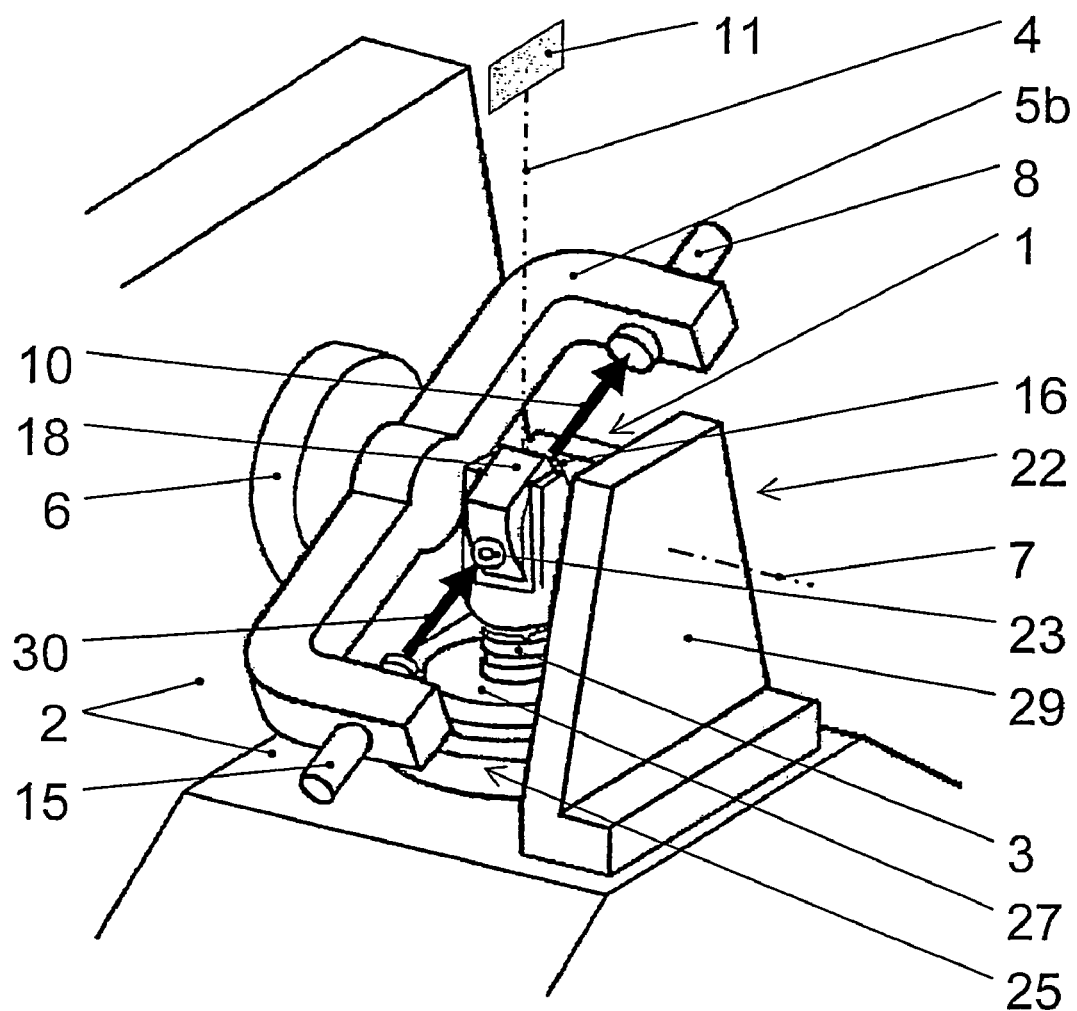
Figure 6:
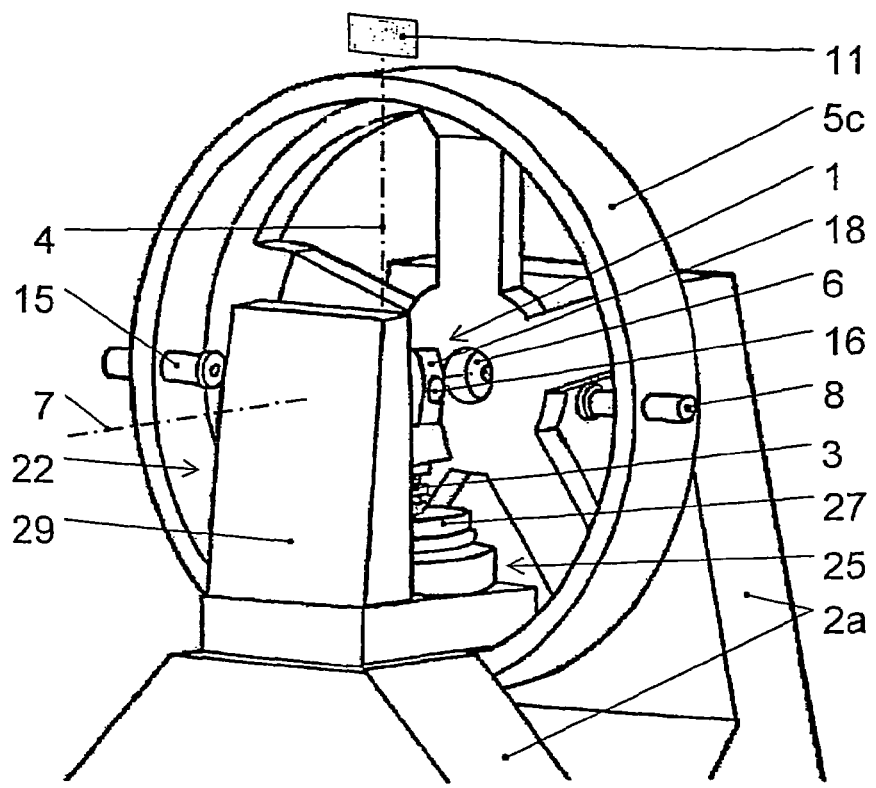
Figure 7:
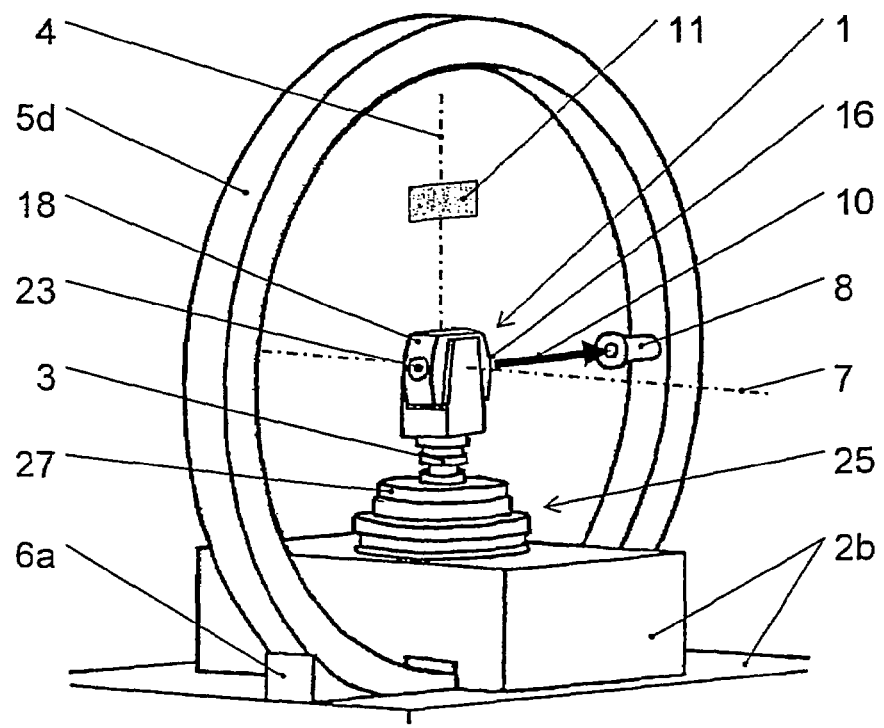
Figure 8:
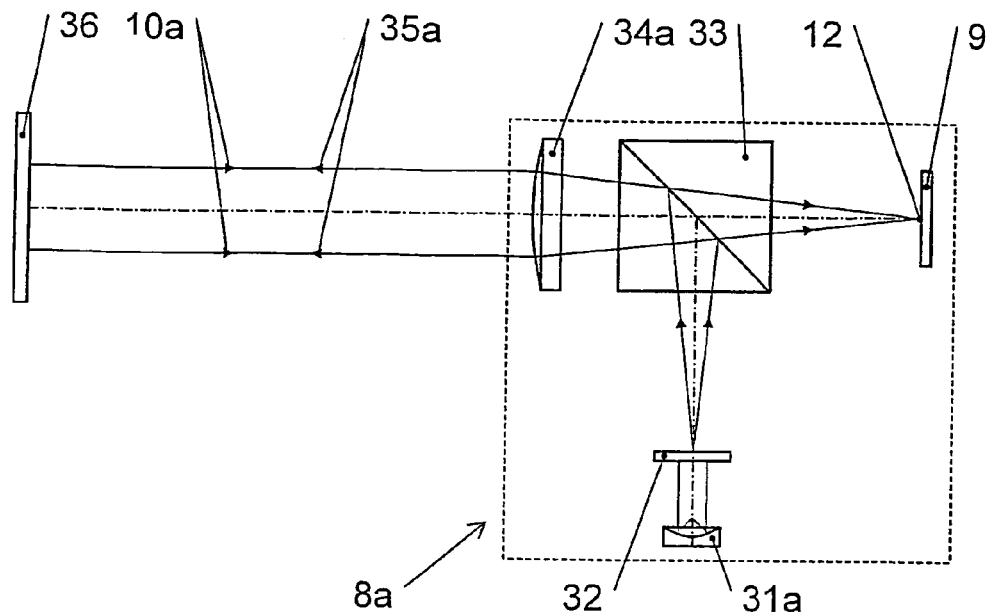
Figure 9:
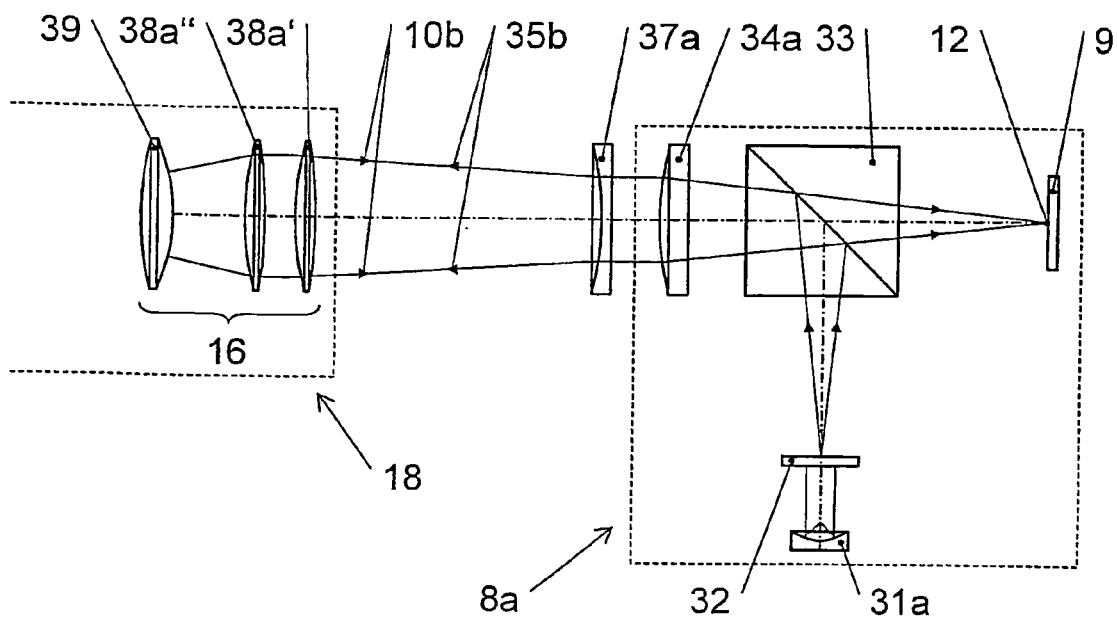
Figure 10:
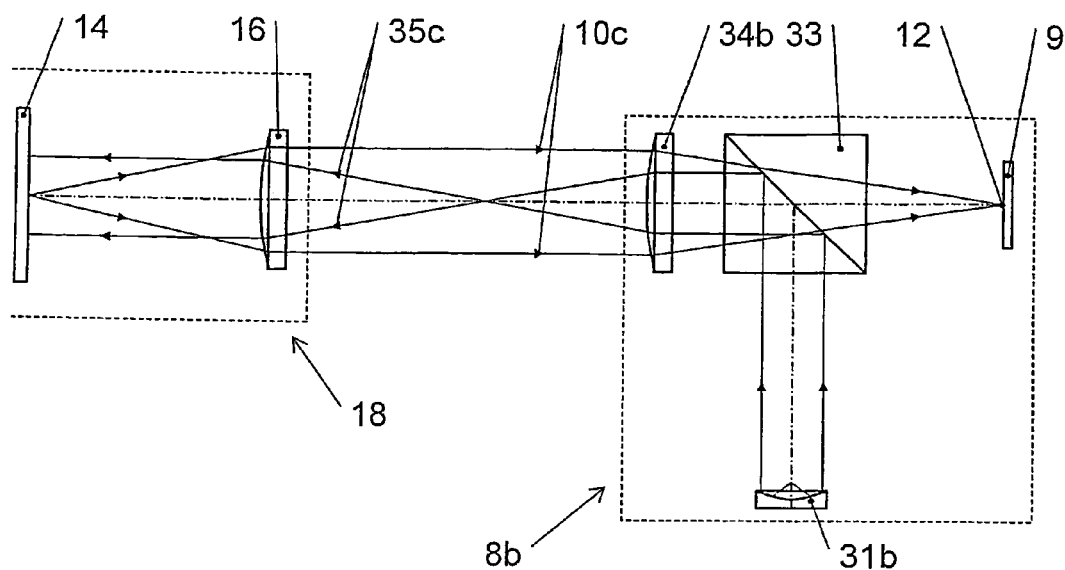
Figure 11:
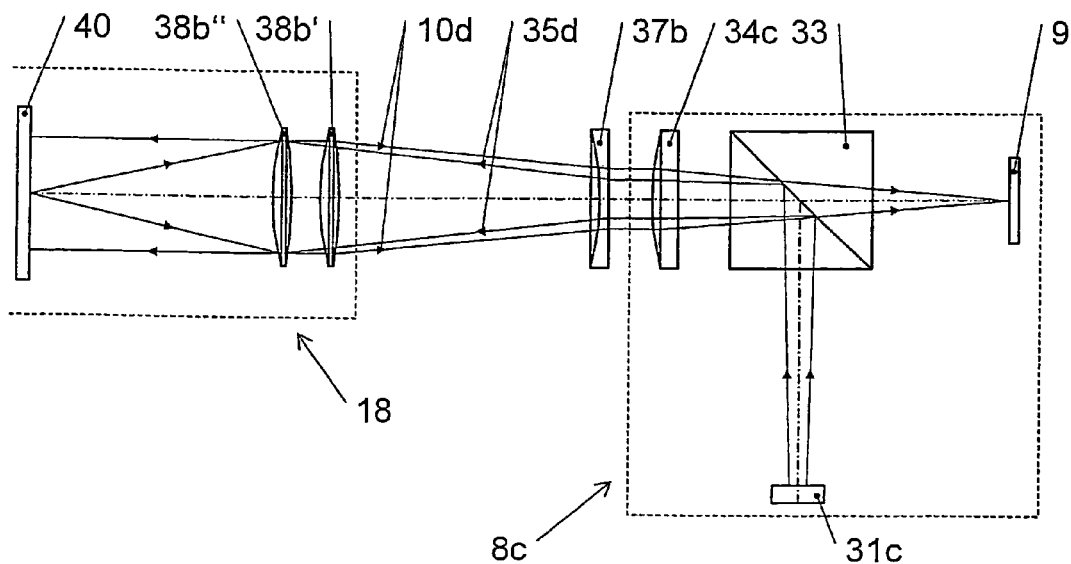

Below, the method according to the invention is described in more detail purely by way of example in the form of specific embodiments partly with reference to devices and with the aid of figures. In the description of the figures, reference is made in some cases to reference numerals of figures already described before. Specifically, FIG. 3 shows a diagram of an embodiment of the device for checking or calibrating the angle-dependent alignment of a reference structure of a high-precision test piece having a measuring rocker mounted on one side as a measuring part;

FIG. 4 shows a simplified sectional diagram of a first alternative embodiment of the device having a measuring rocker mounted on one side as a measuring part and a handling robot;

FIG. 5 shows a simplified sectional diagram of a second alternative embodiment of the device having a measuring rocker mounted on one side as a measuring part and a handling robot;

FIG. 6 shows a simplified sectional diagram of a third alternative embodiment of the device having a measuring wheel mounted on one side as a measuring part and a handling robot;

FIG. 7 shows a simplified sectional diagram of a fourth alternative embodiment of the device having a measuring ring mounted in the middle in the measuring plane as a measuring part;

FIG. 8 shows a schematic diagram of the beam path with a flat reflection surface as a reference structure of the test piece;

FIG. 9 shows a schematic diagram of the beam path with a convex lens as a reference structure of the test piece;

FIG. 10 shows a schematic diagram of the beam path with a reticule as a reference structure of the test piece;

FIG. 11 shows a schematic diagram of the beam path with focusing of a structure within an optical sighting unit on to the detector.

FIG. 3 shows a possible embodiment of a device for carrying out the method according to the invention. The device comprises a granite plinth 2 which rests on a frame 24. The plinth 2 is composed of a plurality of part-elements which together approximately form an L-shape. A horizontal measuring unit 25 which has a retainer part 3 which is rotatable with high precision under motor power about a retainer part axis 4 pointing in the perpendicular direction is present on the plinth 2. The entire device can be inclined by adjusting the frame 24 so that the retainer part axis 4 points exactly in the perpendicular direction, the inclination being monitored by means of an inclinometer (not shown). The rotatable mounting of the retainer part 3 is effected by means of a retainer part bearing unit 27 which is in the form of an air bearing. An angle of rotation of the retainer part between the retainer part 3 and the plinth 2 about the retainer part axis 4 is measurable with high precision by means of a first angle encoder (not shown). A test piece 1 in the form of a theodolite having an optical sighting unit 18 in the form of a telescope which is rotatable by means of an electric motor about a vertical axis 20 and is tiltable by means of an electric motor about a tilting axis 21 is fixed with the lower part 19 of its test piece on the retainer part 3 by means of a fast-action connector 26, the vertical axis 20 of the test piece 1 coinciding with the retainer part axis 4. A measuring part 5 in the form of a measuring yoke which has a U-shape and encompasses the retainer part axis 4 in the manner of tongs in the starting position shown is additionally rotatably arranged on the plinth 2. This measuring part 5 is supported axially and radially by a measuring part bearing unit 6 in the form of an air bearing. The measuring part 5 is rotatable with high precision under motor power relative to the plinth 2 about a measuring part axis 7, an angle of rotation of the measuring part about the measuring part axis 7 between the measuring part 5 and the plinth 2 being measurable with high precision by means of a second angle encoder (not shown). The measuring part axis 7 and the tilting axis 21 lie in a common plane through which the retainer part axis 4 and the vertical axis 20 pass perpendicularly, this point of penetration forming the point of intersection between the measuring part axis 7 and the tilting axis 21 of the test piece 1. Depending on the alignment of the test piece 1 relative to the retainer part 4, the measuring part axis 7 and the tilting axis 21 may lie one on top of the other which is the case in the diagram shown in FIG. 3. Thus it is possible to pivot the sighting unit 18 and the measuring part 5 about a common axis. The measuring part bearing unit 6 is a high-precision air bearing which permits easy but stable pivoting of the measuring part 5 about the measuring part axis 7 while maintaining very small tolerances. Since the measuring part bearing unit 6 is arranged on the plinth 2 on a single side of a measuring plane 11 through which the measuring part axis 7 passes perpendicularly and in which the retainer part axis 4 lies, it is possible to adjust the measuring part bearing unit 6 exactly without resulting in distortions with a bearing unit on the other side of the measuring plane 11 owing to static overdetermination. FIG. 3 schematically shows a small section of the measuring plane 11. As a result of this design of the measuring part 5, which is substantially axially symmetrical with respect to the measuring part axis 7, the centre of gravity of the measuring part 5 occurs after the measuring part axis 7. Consequently, the flexural and torsional loads are substantially avoided and the drive of the measuring part 5 is relieved so that tolerances are kept low and very high accuracies of measurement are achievable. Present on the measuring part 5 is an optical unit 8 having an optical detector (not shown in FIG. 3, see below), the optical unit 8 being arranged on the measuring part 5 so that a test piece beam arriving from the direction of the test piece 1 (not shown in FIG. 3, see below) can be received by the detector, which test piece beam lies substantially in the measuring plane 11 through which the measuring part axis 7 passes perpendicularly and in which the retainer part axis 4 lies. In FIG. 3, the test piece beam is generated by an illuminated reticule arranged in the sighting unit 18 (not shown in FIG. 3). In this case, the reticule is the reference structure, the angular alignment of which is to be checked. Here, the illuminated reticule is focused by means of an objective 16 of the sighting unit 18 on to the detector of the optical unit 8 and thus generates a multiplicity of points on the detector. The position of this image on the detector changes with slight rotation of the retainer part 3 about the retainer part axis 4 and of the test piece 1 about the vertical axis 20 or of the measuring part 5 about the measuring part axis 7 and of the sighting unit 18 about the tilting axis 21. In the case of motor-powered adjustment of the device and of the test piece 1 about the respective axes, subsequent fine alignment, controlled by the position of the image on the detector, and comparison of the respective measured angle values, it is thus possible to carry out checking of the angles in a highly precise manner. Here, a control/regulation unit 13 performs the evaluation of the detector of the optical unit 8 and the motor-powered alignment of the optical unit 8 relative to the reference structure of the test piece 1 by means of motor-powered adjustment of the retainer part 3 and of the measuring part 5 as a function of the position of the image on the detector. In addition, the control/regulation unit 13 performs the actuation of the alignment of the sighting unit 18 of the test piece 1 by means of an electric motor and the determination and the valuation of the measured angle values of the device and of the test piece 1, the communication with the test piece 1 being effected by means of a slip ring system (not shown) arranged in the retainer part 3 or by a radio link via Bluetooth. As can be seen in FIG. 3, it is not possible in the embodiment shown to adjust the measuring part 5 in such a way that the optical unit 8 is positioned close to the zenith. Adjustment of the measuring part 5 beyond the zenith is also not possible since that part of the measuring part 5 which is opposite the optical unit 8 would collide with the horizontal measuring unit 25, and it is for this reason that penetration of the sighting unit 18 of the test piece 1 or a horizontal angular adjustment is necessary for calibrating the opposite angular range. However, this limitation is generally not disadvantageous in practice. Since positioning of the test piece 1 in exact alignment with the vertical axis on the horizontal measuring unit 25 is not possible, a measurement close to the zenith would lead to incorrect results, as described above in the description of the known theodolite test machine. In addition, it is usually not possible for a user directly to carry out a measurement close to the zenith since the eye piece of the sighting unit 18 is inaccessible in this region. However, embodiments in which measurement close to the zenith can also be carried out are described further below.

FIG. 4 shows a simplified sectional diagram of a first alternative embodiment of the device of FIG. 3. As in FIG. 3, the device for checking a test piece 1 has a multi-part plinth 2 with a measuring part bearing unit 6 and a horizontal measuring unit 25 which comprises a retainer part bearing unit 27 and a retainer part 3 rotatable about the retainer part axis 4. The measuring part mounted on a single side of the measuring plane 11 by the measuring part bearing unit 6 in the form of an air bearing is in the form of a measuring rocker 5a which has limbs 5a', 5a'' arranged at right angles to one another. The optical unit 8 is arranged on one of these limbs 5a', 5a''. The device also has a handling robot 22 which comprises a robot plinth 29 and a gripper 28 pivotable about the measuring part axis 7 by means of an electric motor. A mechanical connection can be produced between the gripper 28 and the sighting unit 18 of the test piece 1, in particular the objective 16, so that the sighting unit 18 can be pivoted by means of the handling robot 22. It is therefore possible to check a test piece which has no adjustment of its sighting unit by means of an electric motor, in particular a mechanically adjustable theodolite, using the device, since the alignment of the test piece 1 is performed by the handling robot 22. Owing to a variable geometry of the gripper 28 test pieces of different geometries can be checked.

FIG. 5 shows a second alternative embodiment of the device of FIG. 3 in simplified form in a cut-out. The measuring part is in the form of a measuring rocker 5b, a substantial part of this measuring rocker 5b being axially symmetrical with respect to the measuring part axis 7. In addition to the plinth 2, the measuring part bearing unit 6 arranged on a single side of the measuring plane 11 and in the form of an air bearing, the horizontal measuring unit 25, which comprises the retainer part bearing unit 27 and the retainer part 3 rotatable about the retainer part axis 4, and the handling robot 22 with the robot plinth 29, the test piece 1 is shown with the optical sighting unit 18 including an eye piece 23. In addition to the optical unit 8, an additional optical unit 15 is arranged on the measuring rocker 5b, on that side which is opposite the optical unit 8 with respect to the measuring part axis 7. This additional optical unit 15 is in the form of an additional emitter which generates a radiation 30 which illuminates a reticle (not shown) in the sighting unit 18 on the side of the eye piece 23. The reticle modifies the radiation 30 with regard to a radiation parameter by stopping, this modified radiation forming the test piece beam 10 which leaves the sighting unit 18 via the objective 16, is picked up by the optical unit 8 and produces at least one point on the detector (not shown in FIG. 5). Alternatively, it is possible to form the additional optical unit 15 as an additional mirror. In this case, the radiation is, for example, emitted by the optical unit 8, reflected by the additional mirror and modified by the reticle with regard to a radiation parameter, this modification taking place either before, after or before and after the reflection at the additional mirror, and then strikes the detector. It is furthermore possible for the additional optical unit 15 to emit a radiation 30 having a structuring—for example a pattern. Particularly by comparison of the structuring of the emitted radiation 30 and of the received test piece beam 10 by means of image processing, errors in the optical system of the sighting unit 18, in particular lens errors, aberrations, distortions, focusing errors in the tube, etc. can be detected.

FIG. 6 shows a simplified sectional diagram of a third alternative embodiment of the device with a measuring part in the form of measuring wheel 5c. The measuring wheel 5c is mounted on the measuring part bearing unit 6 arranged on a single side of the measuring plane 11 and in the form of an air bearing so as to be rotatable about the measuring part axis 7. As in the above designs, the device has a horizontal measuring unit 25 with a retainer part bearing unit 27 for mounting the retainer part 3 so as to be rotatable about the retainer part axis 4. Furthermore, the test piece 1 with its sighting unit 18 and the objective 16, positioned on the retainer part 3, and the handling robot 22 with the robot plinth 29, can be seen. Owing to the geometry of the measuring wheel 5c, the device on the other hand has a plinth 2a which is formed so that the measuring wheel 5c encloses the test piece 1 and the horizontal measuring unit 25. Both the optical unit 8 and, on the opposite side, the additional optical unit 15 are arranged on the measuring wheel 5c. The rotationally symmetrical shape of the measuring wheel 5c has the advantage that elastic deformations which occur as a function of the position of the optical unit 8 and the additional optical unit 15 can be substantially avoided. In this embodiment, measurements close to the zenith—in particular while dispensing with the additional optical unit 15—can be carried out since the measuring wheel is substantially freely rotatable—with appropriate positioning of the optical unit 8.

While, in the preceding exemplary embodiments, the measuring part bearing unit is present on a single side of the measuring plane 11, FIG. 7 shows an embodiment in which the measuring part bearing unit is arranged within the measuring plane 11. The horizontal measuring unit 25 fixed on a plinth 2b and having a retainer part bearing unit 27 for rotatable mounting of the retainer part 3 about the retainer part axis 4 corresponds to the preceding description. The test piece 1 with its sighting unit 18, the eye piece 23 and the objective 16, positioned on the retainer part 3, has an illuminated reticle (not shown in FIG. 7), the emitted radiation of which forms the test piece beam 10 after shaping by the objective 16. The test piece 1 and the horizontal measuring unit 25 are enclosed by an annular measuring part in the form of measuring ring 5d. The measuring ring 5d which is rotationally symmetrical in its basic form is mounted so as to be rotatable about the measuring part axis 7, mounting being effected by means of a measuring part bearing unit 6a which is in the form of an air bearing and is arranged on and partly in the multi-part plinth 2b. The outer surface and optionally also the inner surface of the measuring ring 5d are bearing surfaces of the air bearing here. An optical unit 8 mounted on the measuring ring 5d and having an optical detector (not shown in FIG. 7) serves, as already described above, for receiving the test piece beam 10, by means of which the reticle is focused on to the detector of the optical unit 8 and thus produces a multiplicity of points there. Similarly to FIG. 5 and FIG. 6, it is also possible to equip the measuring ring 5d with an additional optical unit 15, in particular an additional emitter or an additional mirror. Since the measuring part bearing unit 6a is arranged in the middle and is present in the measuring plane 11, below the test piece 1 and below the horizontal measuring unit 25, the test piece 1 is easily accessible from both sides, which is advantageous particularly during the mounting of the test piece 1 and calibration work on the test piece 1. Owing to the rotationally symmetrical basic shape of the measuring ring 5d and the measuring part bearing unit 6a present close to or in the perpendicular of the centre of gravity of the measuring ring 5d, flexural and torsional moments on the measuring part are substantially avoided, so that very high accuracies of measurement can be achieved.

FIG. 8 shows the beam path of a possible embodiment in which the optical unit has the design of a known autocollimator and the reference structure of the test piece is formed by a flat reflection surface. The optical unit 8a in the form of an autocollimator comprises an emitter 31a, an optical unit mark 32 in the form of a reticle, a beam splitter cube 33 for physical beam splitting, an optical unit objective 34a and an optical detector 9. The optical unit 8a emits radiation in the form of a collimated emitted beam 35a, which is reflected by a flat reflection surface 36 on the test piece 1, which reflection surface forms the reference structure. This reflected beam which is therefore modified with respect to a radiation parameter forms the test piece beam 10a, which is therefore likewise collimated. If the collimated emitted beam 35a strikes the flat reflection surface 36 substantially perpendicularly, the test piece beam 10a is picked up by the optical unit objective 34a and focused on to the detector 9, on which an image of the optical unit mark 32 is therefore produced and at least one point 12 or a family of such points 12 is produced on the detector 9. The position of this image and of this family of points 12 is dependent on the angular alignment of the optical unit 8a relative to the flat reflection surface 36 or the reference structure of the test piece 1. This flat reflection surface 36 is formed directly by a flat reflection surface as a reference structure on the test piece 1. It is hereby possible also to investigate a polygonal mirror, for example a reference mirror to be used for the rosette method, with regard to the alignment of its mirror surfaces.

However, the reference structure of numerous test pieces which is to be investigated with regard to the angular alignment is often not—as above—formed by a flat surface but by a curved structure, for example a lens present within the objective 16 of the sighting unit 18. FIG. 9 shows the optical unit 8a—as also FIG. 8. However, an additional auxiliary lens 37a changeable in its position and in the form of a scattering lens is present before the optical unit objective 34a, so that the emitted beam 35b diverges. The divergent emitted beam 35b strikes a first and a second collecting lens 38a' and 38a" of the objective 16 of the optical sighting unit 18 of the test piece 1, is focused by these collecting lenses 38a' and 38a", strikes the convex lens 39, which forms the reference structure of the test piece 1 here, and is reflected by this convex lens 39, with the result that a change of radiation parameter takes place. The reflected beam forms the test piece beam 10b, which is focused as described above on to the detector 9 of the optical unit 8a. In order that the main reflection of the transmitted beam 35b takes place at the convex lens 39—and not at a preceding lens—the use of optical filters (not shown in FIG. 9), which are arranged after the emitter 31a, is possible. The checking of the angular alignment by the optical unit 8a is effected in the manner described above. It is possible to convert the device by flexible use of the auxiliary lens 37a from a flat to a convex or optionally a concave reference structure without substantially intervening in the device. The design of the auxiliary lens depends in particular on the form of the lens serving as a reference structure and on the preceding lens system.

In a further embodiment, as shown in FIG. 10, the reference structure is formed by a reticle in the sighting unit of the test piece. The optical unit 8b has an emitter 31b, a beam splitter cube 33 for physical beam splitting, an optical unit objective 34b and an optical detector 9. The optical unit Bb emits radiation in the form of a transmitted beam 35c which is picked up by the objective 16 of the sighting unit 18 of the test piece 1, strikes the reticle 14 of the sighting unit 18 and illuminates this reticle 14. The reticle 14 is present at the focal point of the objective 16 of the sighting unit 18. The reflection caused by this illumination of the reticle 14 forms a beam which, after collimation by said objective 16, represents the test piece beam 10c. This test piece beam 10c is focused by the optical unit objective 34b on to the detector 9, on which an image of the reticle 14 of the sighting unit 18 of the test piece 1 is thus produced, and produces a family of points 12 there. The position of this image or of the family of these points 12 on the detector 9 is dependent on the angular alignment of the sighting unit 18 or of the reticle 14 as a reference structure of the test piece 1 relative to the optical unit 8b of the device. Alternatively, it is possible, for example, not to illuminate the reticle 14 via the objective 16 by means of an emitter 31b within the optical unit 8b but to carry out the illumination on the other side of the reticle on the eye piece 23 side (cf FIG. 5 and FIG. 7) of the sighting unit 18, for example via an additional optical unit 15 (cf FIGS. 5 and 6) in the form of an additional emitter. In the case of a self-illuminating reticle or of a reticle illuminated by illumination within the sighting unit 18, an external emitter can be completely dispensed with. Further possibilities for illuminating the reticle 14 are also possible, where illumination is also to be understood as meaning exposure to a non visible radiation. Instead of the reticle 14, the surface of a beam splitter cube of the sighting unit, of an image recording surface or of a distance-measuring laser diode can also serve as the reflection surface.

If it is intended to investigate a structure or an object, for example a reticle or an aperture, within the sighting unit 18, this can be effected in the manner described in FIG. 11. The optical unit 8c has an emitter 31c, a beam splitter cube 33 for physical beam splitting, an optical unit objective 34c and an optical detector 9. Radiation in the form of a transmitted beam 35d is scattered by the auxiliary lens 37b and illuminates a structure 40 within the optical sighting unit 18 of the test piece 1. This illuminated structure 40 is focused by means of the collecting lenses 38b' and 38b", the auxiliary lens 37b and the optical unit objective 34c on to the detector 9 by means of the beam 10d and can thus be represented graphically and checked. This structure is formed, for example, by an image recording surface, for example a CCD-chip, or a laser diode of a telemeter. Other illumination variants, as already described above, can also be realised here.

It is possible to carry out the test methods described in FIG. 8 to 11 with a single optical unit, optionally with use of different objectives or auxiliary lenses, and thereby to use a single device without complicated conversion for different test pieces or test methods.

The invention claimed is:

1. Method for checking or calibrating the angle-dependent alignment of a reference structure of a high-precision test piece, using a device comprising an adjustable or fixed retainer part for retaining the test piece an adjustable measuring part, the measuring part and the retainer part being rotatable relative to one another about a retainer part axis and a measuring part axis intersecting the retainer part axis at right angles, and an angle of rotation of the retainer part about the retainer part axis and an angle of rotation of the measuring part about the measuring part axis between the measuring part and the retainer part being measurable, an optical unit arranged on the measuring part and having an optical detector for receiving at least one test piece beam which interacts with the test piece and runs substantially in a measuring plane, through which the measuring part axis passes perpendicularly and in which the retainer part axis lies, and produces at least one point on the detector, and a control/regulation unit at least for the motor-powered alignment of the optical unit relative to the reference structure of the test piece by means of motor-powered adjustment of the axis of rotation of the retainer part and of the axis of rotation of the measuring part as a function of the position of the at least one point on the detector comprising the method steps arrangement of the test piece on the retainer part, preliminary alignment of the optical unit and/or of the reference structure of the test piece so that the test piece beam at least partly strikes the detector and produces at least the one point there, evaluation of the position of the at least one point on the detector by the control/regulation unit, relative fine alignment of the optical unit relative to the reference structure by means of the control/regulation unit as a function of the position of the at least one point on the detector so that the at least one point reaches a certain reference position on the detector and determination of at least the angle of rotation of the retainer part and/or of the angle of rotation of the measuring part, radiation being produced by the reference structure of the test piece or being modified with respect to a radiation parameter, in particular by reflection, stopping, filtration or shaping, and the produced or modified beam forming the test piece beam.

2. Method according to claim 1, the test piece in particular a theodolite, a level or a geodetic scanner—having an optical sighting unit which is adjustable about a vertical axis and optionally a tilting axis, determines a sighting axis and has an optically detectable mark, for example a reticule or a light exit,
    an angle of rotation of the vertical axis and optionally an angle of rotation of the tilting axis being determinable, and a test piece lower part being arranged on the retainer part so that the retainer part axis is substantially collinear with the vertical axis and optionally the measuring part axis is substantially collinear with the tilting axis, a preliminary alignment of the optical sighting unit being effected before or during the preliminary alignment of the optical unit, and the angle of rotation of the vertical axis and/or optionally the angle of rotation of the tilting axis being determined.

3. Method according to claim 2, the radiation being emitted and shaped by an emitter arranged in the optical unit, the radiation then being reflected by the reference structure of the test piece and the test piece beam thus being formed, and the test piece beam being focussed on to the detector on striking a part of the optical unit and, in the case of exact alignment of the optical unit relative to the reference structure, producing at least one point on the detector.

4. Method according to claim 3, the reference structure being formed by a lens of the sighting unit.

5. Method according to claim 3, the reference structure being formed by a beam splitter cube of the sighting unit.

6. Method according to claim 3, the reference structure being formed by an image recording surface—in particular a CCD chip—of the sighting unit.

7. Method according to claim 2, the reference structure being formed by the optically detectable mark which is illuminated actively or passively at least during the fine alignment, and the radiation being produced by the mark or modified with respect to the radiation parameter.

8. Method according to claim 7, the mark being in the form of a reticule, which reticule is self-illuminating or is illuminated, at least during the fine alignment, by an emitter arranged in the optical sighting unit, the test piece beam thus formed being focussed directly or indirectly at least partly on to the detector by means of an objective of the sighting unit and thus producing the at least one point on the detector.

9. Method according to claim 7, the mark being in the form of a reticule and being illuminated, at least during the fine alignment, by means of an emitter arranged on the side of an objective of the sighting unit, the reticule being focussed directly or indirectly at least partly on to the detector by means of the objective of the sighting unit and thus producing the at least one point on the detector.

10. Method according to claim 7, the mark being in the form of a reticule and being illuminated, at least during the fine alignment, by means of an additional emitter arranged on the side of an eyepiece of the sighting unit, in particular by means of an additional optical unit, the reticule being focused directly or indirectly at least partly on to the detector by means of an objective of the sighting unit and thus producing the at least one point on the detector.

11. Method according to claim 2, the radiation being emitted in the direction of the eye piece by an additional optical unit arranged on the side of an eye piece or of an objective of the sighting unit and having a three-dimensional structuring, in particular in the form of a pattern, the radiation passing through the sighting unit, being modified by at least one reference structure in the sighting unit with respect to a radiation parameter and thus forming the test piece beam, and the test piece beam, after emergence from the objective or eye piece of the sighting unit, being focused on to the detector on striking a part of the optical unit, and producing a multiplicity of points on the detector, and optical errors, in particular aberrations and distortions, being detectable by evaluation of the multiplicity of points, detected by the detector, by the control/regulation unit.

12. Method according to claim 2, a structure of at least a part of the sighting unit being focused on to the detector.

13. Method according to claim 1, the test piece having a laser telemeter with a laser measuring beam emitter forming the reference structure and intended for producing a laser measuring beam which forms the test piece beam, comprising the additional method step of emission of a laser measuring beam by the laser telemeter.

14. Method according to claim 1, the test piece being heated at least from one side by a thermal emitter for determining the thermal behaviour.

\* \* \* \* \*